March 26, 1968 R. J. BRIDGES 3,375,412

SWITCHING CIRCUITS

Filed Dec. 14, 1964

INVENTOR
RICHARD J. BRIDGES

BY Burns, Doane, Benedict, Swecker & Mathis
ATTORNEYS

United States Patent Office 3,375,412
Patented Mar. 26, 1968

3,375,412
SWITCHING CIRCUITS
Richard J. Bridges, Baltimore, Md., assignor to Koppers Company, Inc., Pittsburgh, Pa., a corporation of Delaware
Filed Dec. 14, 1964, Ser. No. 417,923
16 Claims. (Cl. 317—148.5)

ABSTRACT OF THE DISCLOSURE

A bidirectional switching circuit comprising three cascaded transistors and including means for preventing relay chatter, the means including capacitors connected between the collector electrodes of successive transistors to reduce the A.C. gain of the system and to introduce a time constant which will prevent operation of the circuit at the ripple frequency of a rectified, unfiltered voltage input. In lieu of the capacitor connected between the collector electrodes, a resistor and a diode may be connected in series between the collector electrode of the second transistor and the base electrode of the first transistor.

Figure 1:
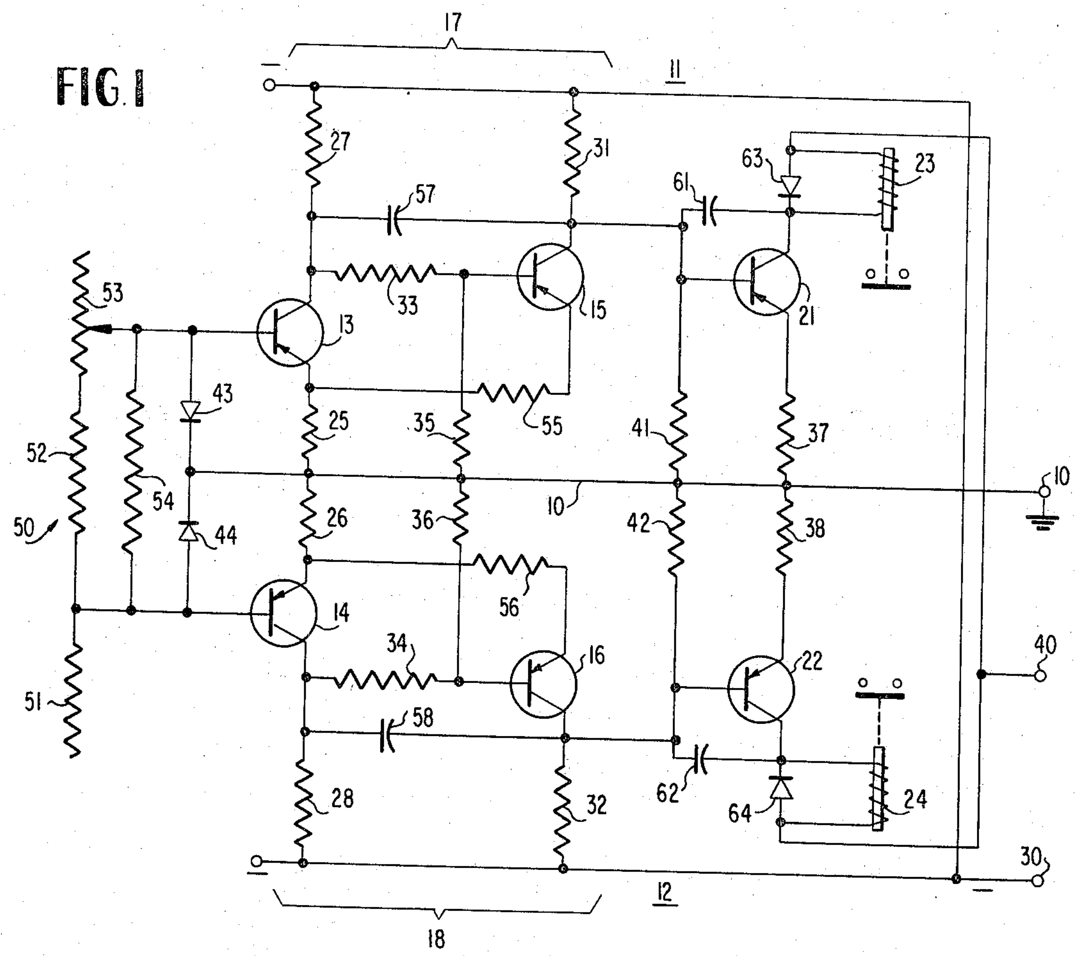

This invention relates to electronic switching circuits for controlling the actuation of power operated devices in response to variable low level error signals. The invention, while not limited thereto, is particularly useful in precision servo systems for initiating or terminating a bidirectional corrective action in response to the polarity of small error signals of low power.

In the automatic control of high voltage relays for operating industrial equipment it is not uncommon to employ relay systems in which highly sensitive moving-contact relays are connected to detect a variable error signal. These may be and often are cascaded with one or more power relays to control equipment for taking a corrective action. Such relay systems when performing in industrial environments are frequently subject to malfunction for diverse reasons. For example, because of low contact pressure at or near the point of contact closure, delicate relays are sensitive to vibration, shock, stray AC signals, and the presence of physical contaminants such as dust. It is a common experience for such sensitive relays to exhibit contact chatter on slowly varying signals. As a result, arcing may occur and may greatly reduce the life of the relay contacts. In addition, the relay contacts may weld shut causing damage to any associated components.

Some electronic switching circuits have been devised employing transistors instead of delicate moving contact relays for the control of power relays. Switching circuits of this type have almost invariably been of substantially higher cost than corresponding moving contact relay systems. In addition, especially in highly sensitive precision systems, it has generally been necessary to construct the switching circuits of high precision components. In addition, elaborate measures are often necessary to protect against chatter induced by the presence of strong AC fields, AC signals and against temperature responsive variations in sensitivity of the circuit.

This invention has as a principal object to provide sensitive and reliable bidirectional switching circuits which may be constructed of comparatively low cost components for controlling the operation of power relays or other power operated devices.

A further object of the invention is to provide a highly sensitive snap-acting switching circuit having stable and precise switching characteristics over wide temperature ranges.

It is a further object of the invention to provide solid state switching circuits which, though sensitive to small error signals, are relatively insensitive to stray AC fields, and signals.

Yet another object of the invention is to provide low cost bidirectional solid state switching circuits of great sensitivity and reliability for controlling the actuation of associated load devices such as high voltage relays in either of two opposite senses in response to low level error signals which may vary both in polarity and in magnitude.

By way of a brief summary of an illustrative embodiment of the invention, a bidirectional switching circuit is provided which employs parallel symmetrical circuits, each containing three cascaded transistors operated in switching modes. Each of the two symmetrical circuits controls the energization of a power relay in its respective output. The input circuit configuration, which accounts for the bidirectional operation of the switching circuit, permits a signal of a particular polarity across certain input resistors to switch one of the symmetrical transistor circuits to operate its associated relay whereas a signal of reverse polarity deenergizes the first relay and energizes the second relay.

The input circuit includes a pair of diodes each connected in the emitter-base circuit of a respective one of the input transistors. These two diodes are poled in opposite current-carrying directions with respect to the input signal source. A capacitor connected from the collector of the first or input transistor to the collector of the next succeeding transistor renders the switching circuit relatively insensitive to AC signals induced in the circuit from surrounding stray fields, and any AC ripple that might be present from the signal source. As an example of AC ripple, when the switch is used to sense armature voltage of a DC motor a fair amount of AC signal is present as it is impractical to filter the DC supply of large horsepower DC motors. In each of the symmetrical switching circuits a small resistor connected in circuit between the emitter of the input transistor and the emitter of the next succeeding transistor effectively reduces the hysteresis, i.e., the switching differential, of each side of the circuit.

Figure 2:
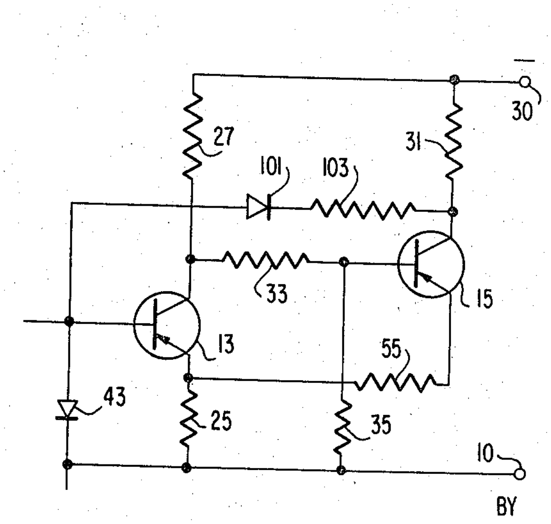

Although the invention is not to be limited except by the claims appended hereto, further details of the invention, as well as additional objects and advantages thereof, will be more clearly perceived in connection with the following detailed description of an exemplary embodiment taken together with the accompanying drawings wherein:

FIGURE 1 is a circuit diagram illustrating a preferred embodiment of the invention; and FIGURE 2 is a circuit diagram illustrating a modified form of the invention.

Referring generally to FIGURE 1, the illustrated switching system shown therein contains symmetrical circuits 11 and 12 connected to a common ground 10. It is not necessary to ground the circuit at point 10. Many applications require that the entire circuit be floated above ground. That portion of circuit 11 containing transistors 13 and 15 constitutes a monostable trigger circuit 17 operating the transistors therein in a switching mode to provide snap action. Transistors 14 and 16 in trigger circuit 18 perform a similar function in circuit 12. Transistors 21 and 22 are high voltage transistors which provide the necessary switching power for operating load devices such as power relays 23 and 24 respectively. Although all transistors shown in FIGURE 1 are of the PNP type, it is to be understood that NPN transistors may also be used with the customary changes in polarity of the circuit. Other types of load devices may obviously replace the relays 23 and 24.

The emitters of input transistors 13 and 14 are connected through resistors 25 and 26 respectively to a common terminal represented by ground 10. Their collectors are connected through resistors 27 and 28 respectively to a single source of negative operating potential 30, although separate power supplies may also be used if desired for each side of the circuit. The collectors of transistors 15 and 16, the output transistors of the trigger circuits, are also connected to the negative potential source 30 through resistors 31 and 32 respectively. Resistor 33 connecting the base of transistor 15 with the collector of transistor 13 provides a path for switching currents in the emitter-base circuit of transistor 15; similarly the collector of transistor 14 is connected through resistor 34 to the base of transistor 16 for controlling the operation of the latter. Resistors 35 and 36, through which the base electrodes of transistors 15 and 16 are connected to ground, provide the bias current for these transistors.

High potential transistors 21 and 22, controlled by trigger circuits 17 and 18 respectively, have their emitters connected to ground 10 through resistors 37 and 38 respectively. The base electrodes of the latter transistors are connected directly to the collectors of transistors 15 and 16 in their associated trigger circuits and are connected to ground through resistors 41 and 42 respectively. A series path can be traced through the emitter-collector junction of transistor 21 through the operating winding of relay 23 to a source 40 of negative operating potentials which may be substantially greater than that of source 30.

The input circuit to the trigger circuits 17 and 18 comprises a pair of diodes 43 and 44 connecting the bases of transistors 13 and 14 respectively to a common terminal represented by ground 10. Each of these diodes is poled in a current-carrying direction opposite to that of the emitter-base junction of the input transistor associated therewith. The circuit illustrated is shown as deriving input signals from a potential divider 50 connected to supply input error signals across the bases of input transistors 13 and 14. The potential divider 50 includes resistors 51 and 52 and a potentiometer 53. In some applications of the invention the slider on potentiometer 53 may be operated mechanically in response to whatever corrective actions are taken as a result of the operation of load devices 23 or 24 under the influence of the switching circuit. The input resistor 54 connected from base to base of transistors 13 and 14 is employed for the purpose of adjusting the input sensitivity of the switching circuit.

The operation of the circuit is as follows. If no potential difference exists between the bases of transistors 13 and 14 the relays 23 and 24, i.e., the load devices, are deenergized with both sets of their associated contacts open. This results from the fact that transistors 13 and 14 are not conducting. Consequently, the elevated potentials on the bases of transistors 15 and 16 support sufficiently high emitter-base currents to hold these latter transistors in saturation. As a result, the base circuits of transistors 21 and 22 are near ground potential. Because transistors 21 and 22 are substantially nonconducting, substantially no current flows through the windings of relays 23 and 24.

When an input signal appears across the potential divider 50, which results in the base of transistor 14 becoming more positive than that of transistor 13, a current flows through diode 44, resistor 25 and the emitter-base junction of transistor 13. The polarity of the input signal under such conditions blocks any current from flowing in the emitter-base circuit of transistor 14. As the signal current increases, the potential on the emitter 13 increases, i.e., becomes less negative with respect to the source of negative potential 30. At a particular emitter potential on transistor 13 which may be designated the trip potential, the conductance states of transistors 13 and 15 reverse rapidly with a snap action as transistor 13 goes into saturation and transistor 15 drops out.

The reversal of the conductance states of transistors 13 and 15 takes place very rapidly. The rapidity of the switching action is due in large measure to the fact that transistor 15, when on, draws more current than does transistor 13. For this purpose, resistor 31 is purposely selected to have a lower resistance than that of resistor 27. Consequently, when transistor 15 begins to come out of saturation the potential on the emitter of transistor 13 increases quite rapidly, further contributing to the speed of the snap action.

As transistor 15 drops out of saturation into its low conductivity state, the potential on the base of transistor 21 switches to a high potential driving transistor 21 into saturation to operate the relay 23 in its collector circuit. The operation of the relay may control a corrective function which will result in decreasing the input error signal applied to the switching circuit. As the error signal decreases, the reverse operation occurs returning the circuit to its original condition.

If the polarity of the incoming signal should subsequently reverse, the opposite side 12 of the switching circuit operates in precisely the same manner described in connection with portion 11 of the switching circuit. A snap-acting reversal of the conductivity states of transistors 14 and 16 then turns on high potential transistor 22, thereby energizing relay 24 to close its contacts for taking an opposite corrective action.

In operation, a switching differential exists between the magnitude of the input signal potential required to turn either trigger circuit on and the magnitude of the input signal potential at which that trigger circuit turns off. The difference between these two operating points is known as the hysteresis of the circuit. It is generally desirable to reduce the hysteresis to as low a value as possible. This has been accomplished in the circuit illustrated by raising the emitter potential of the output transistors of the trigger circuits above that of the input transistors. For this purpose, a small value resistor 55 within the current conducting path, joins the collectors of transistors 13 and 15. A similar resistor 56 joins the emitters of transistors 14 and 16.

During the operation of either side of the switching circuit, a point may exist at which all the transistors on one side are all partially on. In this condition, the circuit can act as an amplifier and especially in the presence of strong AC fields, and signals, frequent and rapid chattering of the contacts of relays 23 or 24 might occur. To avoid this possibility capacitors 57 and 58 are included in trigger circuits 17 and 18 respectively joining the collector electrodes of the input and output transistors therein. Similarly, the capacitor 61 joins the collector of transistor 15 with that of transistor 21 and an additional capacitor 62 joins the collectors of transistors 16 and 22. The addition of these four capacitors, but especially those capacitors in the trigger circuits, reduces the AC gain of both sides of the switching circuit effectively to zero, thereby enabling the unit to operate unshielded and with precision in the presence of large amounts of AC flux substantially free of chatter. The diodes 63 and 64 connected across the windings of relays 23 and 24 respectively are employed conventionally to eliminate inductive potential surges produced by the rapid switching of currents in the relay windings.

With operating potentials of minus ten volts supplied to terminal 30 and minus ninety volts at terminal 40, the following values and identities of circuit components have been found effective in a circuit having the configuration illustrated in FIGURE 1:

| | | |
|---|---|---|
| Transistors: | | |
| 13, 14, 15, 16 | | 2N398 |
| 21, 22 | | 2N1305 |
| Diodes: | | |
| 43, 44 | | 1N695 |
| 63, 64 | | 1N2069 |
| Resistors: | | |
| 25, 26, 33, 34 | ohms | 100 |
| 27, 28 | | 3.5K |
| 31, 32 | | 2.7K |
| 35, 36 | | 4.3K |
| 37, 38 | | 1.0K |
| 41, 42 | | 10K |
| 55, 56 | ohms | 39 |
| 52 | | 5K |
| 53 | | 5K |
| 54 | | 51K |
| Capacitors: | | |
| 57, 58, 61, 62 | microfarads | 1 |

The transistors identified above are germanium transistors and are preferred for their low cost. Thermistors, silicon transistors, and other components of higher cost are not required for stable operation in the circuit illustrated, although the temperature range of the circuit can be increased by the use of such elements. A variety of transistors could be employed with similar results. Standard 10% resistors may be used throughout the circuit with substantially no adverse affects on the operational characteristics. In most cases the input sensitivity variations at any particular operational temperature will be almost unmeasurable even with the use of large tolerance circuit components.

Although a substantial number of permissible modifications may be made in the above described switching circuit without departing from the practice of this invention, one particular alternative embodiment deserves special mention. In FIGURE 2 is shown a modification of part of the FIGURE 1 circuit. For convenience, those circuit elements which are identical to the ones employed in FIGURE 1 are designated by the same reference numerals. This circuit employs an alternate approach to the elimination of chatter to that used in the FIGURE 1 circuit. Instead of the capacitor 57 connected across the collector electrodes of transistors 13 and 15, a diode 101 and resistor 103 are connected in series from the base of transistor 13 to the collector of transistor 15. The diode 101 may be of the same type as diode 43 and the resistor 103 is preferably of a relatively high value such as 150K. With the circuit at its initial condition with transistor 13 turned off and transistor 15 saturated, when an input signal starts to switch the circuit, the fast rise of the collector potential on transistor 15 is transferred through diode 101 and resistor 103 to the base circuit of transistor 13, clamping it on hard.

The switching which takes place is quite sudden and is distinguished by a desirable snap-action. Connecting the base of the first transistor to the collector of the second through a resistor and diode does, however, tend to increase the hysteresis of the circuit. For this reason where hysteresis reduction is particularly important, the use of the circuit shown in FIGURE 1 is recommended in preference to that of FIGURE 2.

It can be seen that the invention permits the construction of a bidirectional switching circuit primarily of solid state components to increase the reliability of the circuit. Circuits of this nature may have a very high input sensitivity of 40 microwatts or less depending on the input circuit configuration. The trigger circuits employed give the switching circuit a very fast and positive action without chatter. Such a circuit can operate a wide variety of relays or other load devices requiring high driving potentials and driving currents. These circuits, which possess an inherent stability, are capable of functioning effectively with very large input circuit overloads, although in some installations it may be desirable to increase the overload protection through the use of Zener diodes or the like in the input circuit. Additionally, the entire circuit can be used in very strong AC fields with no adverse effects. Also it can be used when a large amount of AC ripple is present on the incoming signal.

It can thus be seen that the objects of this invention have been fulfilled by circuits which possess several advantages. The appended claims are intended to encompass all variations and modifications as are within the true spirit and scope of the invention in its broader aspects.

What is claimed is:

1. A bidirectional switching circuit comprising:
   a pair of monostable trigger circuits each including an input transistor and an output transistor operated in a switching mode and interconnected such that each input transistor is substantially nonconductive and the output transistor associated therewith is conductive in the stable states of said monostable trigger circuits, each of said transistors having an emitter, a collector and a base electrode; the collector electrodes of said input and output transistors being connected through a capacitor;
   means for supplying operating potentials across the emitter-collector junction of each of said input transistors, the emitters of said input transistors being connected to a common terminal;
   a pair of input circuit diodes each connecting the base of a respective one of said input transistors to said common terminal, each of said diodes being poled in a current-carrying direction opposite to that of the emitter-base junction of the input transistor associated therewith;
   means for applying input signals across the bases of said input transistors, whereby input signals of one polarity block emitter-base currents in one of said input transistors while setting up circuit-controlling currents through its associated diode, said common teminal and the emitter-base junction of the other of said input transistors, and whereby input signals of the opposite polarity block current flow in the emitter-base junction of said other input transistor and set up circuit-controlling currents through the other of said diodes, said common terminal and the emitter-base junction of said one transistor;
   and means responsive to the conductance states of said output transistors for selectively controlling the operation of electrical load means.

2. The circuit of claim 1 wherein said electrical load means comprises:
   a pair of load devices each responsive to the conducttance state of a respective one of said output transistors.

3. The circuit of claim 1 wherein said electrical load means comprises:
   a pair of switching transistors each controlled by a respective one of said output transistors;
   and a pair of moving contact relays each having operating windings connected to be energized in response to the state of conductance of a respective one of said switching transistors.

4. A bidirectional switching circuit comprising:
   a pair of monostable trigger circuits each including an input transistor and an output transistor operated in a switching mode and interconnected such that each input transistor is substantially nonconductive and the output transistor associated therewith is conductive in the stable states of said monostable trigger circuits, each of said transistors having an emitter, a collector and a base electrode;
   means for supplying operating DC potentials across the emitter-collector junction of each of said input transistors, the emitters of said input transistors being connected to a common terminal;

a pair of input circuit diodes each connecting the base of a respective one of said input transistors to said common terminal, each of said diodes being poled in a current-carrying direction opposite to that of the emitter-base junction of the input transistor associated therewith;

means for applying input signals across the bases of said input transistors, whereby input signals of one polarity block emitter-base currents in one of said input transistors while setting up circuit-controlling currents through its associated diode, said common terminal and the emitter-base junction of the other of said input transistors, and whereby input signals of the opposite polarity block current flow in the emitter-base junction of said other input transistor and set up circuit-controlling currents through the other of said diodes, said common terminal and the emitter-base junction of said one transistor;

means for rendering said trigger circuits substantially insensitive to AC signals induced in said circuit including a capacitor connected in each trigger circuit between the collector electrodes of the input and output transistors therein;

and means responsive to the conductance states of said output transistors for selectively controlling the operation of electrical load means.

5. A bidirectional switching circuit comprising:

a pair of monostable trigger circuits each including an input transistor and an output transistor operated in a switching mode and interconnected such that each input transistor is substantially nonconductive and the output transistor associated therewith is conductive in the stable states of said monostable trigger circuits, each of said transistors having an emitter, a collector and a base electrode;

means for supplying operating DC potentials across the emitter-collector junction of each of said input transistors, the emitters of said input transistors being connected to a common terminal;

a pair of input circuit diodes each connecting the base of a respective one of said input transistors to said common terminal, each of said diodes being poled in a current-carrying direction opposite to that of the emitter-base junction of the input transistor associated therewith;

means for applying input signals across the bases of said input transistors, whereby input signals of one polarity block emitter-base currents in one of said input transistors while setting up circuit-controlling currents through its associated diode, said common terminal and the emitter-base junction of the other of said input transistors, and whereby input signals of the opposite polarity block current flow in the emitter-base junction of said other input transistor and set-up circuit-controlling currents through the other of said diodes, said common terminal and the emitter-base junction of said one transistor;

means for rendering said trigger circuits substantially chatter-free including a capacitor connected in each trigger circuit between the collector electrodes of the input and output transistors therein;

means for minimizing the hysteresis of said trigger circuits including resistance means connected in each trigger circuit between the emitter electrodes of the input and output transistors therein to raise the emitter potentials of said output transistors above those of said input transistors;

and means responsive to the conductance states of said output transistors for selectively controlling the operation of electrical load means.

6. The circuit of claim 5 wherein said electrical load means comprises:

a pair of load devices each responsive to the conductance state of a respective one of said output transistors.

7. The circuit of claim 5 wherein said electrical load means comprises:

a pair of switching transistors each controlled by a respective one of said output transistors;

and a pair of moving contact relays each having operating windings connected to be energized in response to the state of conductance of a respective one of said switching transistors.

8. A trigger circuit comprising:

a pair of transistors connected to operate in a switching mode and to assume opposite current-controlling states in response to an input signal applied to one of said transistors;

and means for minimizing chatter in said trigger circuit comprising a low resistance circuit branch including a capacitor bridging the collector electrodes of said transistors.

9. A trigger circuit comprising:

a pair of cascaded transistors connected to operate in a switching mode;

means for controlling the conductance of the second of said transistors in response to the current conducting state of the first of said transistors comprising circuit connections between the collector of said first transistor and the base of said second transistor;

and means rendering said trigger circuit substantially insensitive to AC signals comprising a capacitor connected across the collectors of said transistors.

10. A trigger circuit comprising:

first and second transistors connected to assume opposite current-controlling states in response to an input signal of a given polarity and magnitude applied to said first transistor;

means for rendering said trigger circuit substantially chatter-free comprising a circuit branch including a capacitor bridging the collector electrodes of said transistors;

and a resistive circuit branch connecting the collectors of said transistors to raise the emitter potential of said second transistor above that of said first transistor to reduce the hysteresis of said trigger circuit.

11. A switching circuit comprising:

a trigger circuit including input and output transistors connected to operate in a switching mode to assume opposite states of conductance, means in said trigger circuit for reversing the conductance states of said input and output transistors in response to an input signal of preselected polarity and magnitude applied through the emitter-base junction of said first transistor, resistance means connecting the emitter of said input transistor to one terminal of a power supply, resistance means connecting the emitter of said input transistor to the emitter of said output transistor, means for applying to the base of said output transistor a potential responsive to that at the collector of said input transistor, and capacitance means bridging the collectors of said transistors;

a load device; and means for controlling the energization of said load device comprising a third transistor connected to be switched between high and low conductance states in response to the potentials across said output transistor in said trigger circuit.

12. The circuit of claim 3 wherein the collector electrode of said switching transistor is capacitively coupled to the collector electrode of the respective one of said output transistors.

13. The circuit of claim 7 wherein said switching transistors have base, emitter and collector electrodes, said collector electrodes being connected through a capacitor to the collector electrode of the respective one of said output transistors.

14. A bidirectional switching circuit comprising:

a pair of monostable trigger circuits each including an input transistor and an output transistor operated in a switching mode and interconnected such that each input transistor is substantially nonconductive and the output transistor associated therewith is conductive in the stable states of said monostable trigger circuits, each of said transistors having an emitter, a collector and a base electrode, the collector electrodes of said output transistors being connected through a resistor and a diode to the respective base electrodes of said input transistor;

means for supplying operating potentials across the emitter-collector junction of each of said input transistors, the emitters of said input transistors being connected to a common terminal;

a pair of input circuit diodes each connecting the base of a respective one of said input transistors to said common terminal, each of said diodes being poled in a current-carrying direction opposite to that of the emitter-base junction of the input transistor associated therewith;

means for applying input signals across the bases of said input transistors, whereby input signals of one polarity block emitter-base currents in one of said input transistors while setting up circuit-controlling currents through its associated diode, said common terminal and the emitter-base junction of the other of said input transistors, and whereby input signals of the opposite polarity block current flow in the emitter-base junction of said other input transistor and set up circuit-controlling currents through the other of said diodes, said common terminal and the emitter-base junction of said one transistor;

and means responsive to the conductance states of said output transistors for selectively controlling the operation of a pair of switching transistors each controlled by a respective one of said output transistors, the collector electrodes of said switching transistors being coupled through a capacitor to the respective one of the collector electrodes of said output transistors.

15. A switching circuit comprising:

first, second and third transistors connected in cascade, said transistors having base, emitter and collector electrodes;

means for biasing said transistors;

input means connected to the base electrode of said first transistor;

a relay connected to the output of said third transistor; and means for reducing the chatter of said relay comprising a first capacitor connected between the collector electrodes of said first and second transistors and a second capacitor connected between the collector electrodes of said second and third transistors.

16. A switching circuit comprising:

first, second and third transistors connected in cascade, said transistors having base, emitter and collector electrodes;

means for biasing said transistors;

input means connected to the base electrode of said first transistor;

relay connected to the output of said third transistor; and means for reducing the chatter of said relay comprising capacitor means connecting the collector electrodes of said second and third transistors and means including a resistor and a diode connecting the collector electrodes of said first and second transistors.

References Cited

UNITED STATES PATENTS

| | | | |
|---|---|---|---|
| 2,954,436 | 9/1960 | Maniere et al. | 317—123 |
| 2,985,774 | 5/1961 | Carbone et al. | 317—123 X |
| 3,065,388 | 11/1962 | Pinckaers | 317—148.5 |
| 3,302,037 | 1/1967 | Neumann | 317—148.5 X |

LEE T. HIX, *Primary Examiner.*